United States Patent Office 3,822,351
Patented July 2, 1974

3,822,351
COMPOSITIONS AND METHOD FOR CONTROL-
LING *AEROBACTER AEROGENES*
Bernard F. Shema, Glenside, Robert H. Brink, Jr., Doyles-
town, and Roger L. Justice, Warminster, Pa., assignors
to Betz Laboratories, Inc., Trevose, Pa.
No Drawing. Filed Feb. 14, 1972, Ser. No. 226,200
Int. Cl. A01n *13/00*
U.S. Cl. 424—131               10 Claims

ABSTRACT OF THE DISCLOSURE

The present invention relates to certain processes and compositions useful for inhibiting and/or controlling the growth of slime in water and, in particular, water employed for industrial purposes. Water employed in the manufacture of pulp paper and water employed in cooling water systems, as well as other industrial waters, provide environments which are conducive to slime formation. The novel compositions of the present invention are mixtures which show unexpected synergistic activity against microorganisms, including bacteria, fungi and algae, which produce slime in aqueous systems. The slime, of course, is objectionable from an operational and/or an aesthetic point of view. Specifically, the invention is directed to and the use of compositions comprising a combination of 3,3,4,4-tetrachlorotetrahydrothiophene-1,1-dioxide (or derivatives thereof) and bis(tri-n-butyl tin) oxide. The inventive compositions inhibit the growth of slime in water, or more specifically, possess biocidal activity against bacteria, fungi and/or algae.

BACKGROUND OF THE INVENTION

The formation of slime by microorganisms is a problem which attends many systems. For example, lagoons, lakes, ponds, pools and such systems as cooling water systems and pulp and paper mill systems all possess conditions which are conducive to the growth and reproduction of slime-forming microorganisms. In both once-through and recirculating cooling systems, for example, which employ large quantities of water as a cooling medium, the formation of slime by microorganisms is an extensive and constant problem.

Airborne organisms are readily entrained in the water from cooling towers and find this warm medium an ideal environment for growth and multiplication. Aerobic and heliotropic organisms flourish on the tower proper while other organisms colonize and grow in such areas as the tower sump and the piping and passages of the cooling system. Such slime serves to deteriorate the tower structure in the case of wooden towers. In addition, the deposition of slime on metal surfaces promotes corrosion. Furthermore, slime carried through the cooling system plugs and fouls lines, valves, strainers, etc. and deposits on heat exchange surfaces. In the latter case, the impedance of heat transfer can greatly reduce the efficiency of the cooling system.

In pulp and paper mill systems, slime formed by microorganisms is also frequently and, in fact, commonly encountered. Fouling or plugging by slime also occurs in the case of pulp and paper mill systems. Of greater significance, the slime becomes entrained in the paper produced to cause breakouts on the paper machines with consequent work stoppages and the loss of production time or unsightly blemishes in the final product; this, of course, results in rejects and wasted output. The previously discussed problems have resulted in the extensive utilization of biocides in cooling water and pulp and paper mill systems. Materials which have enjoyed widespread use in such applications include chlorine, organo-mercurials, chlorinated phenols, organo-bromines and various organo-sulfur compounds. All of these compounds are generally useful for this purpose but each is attended by a variety of impediments. For example, chlorination is limited both by its specific toxicity for slime-forming organisms at economic levels and by the ability of chlorine to react which results in the expenditure of the chlorine before its full biocidal function may be achieved. Other biocides are attended by high costs, odor problems and hazards in respect to storage, use or handling which limit their utility. To date, no one compound or type of compounds has achieved a clearly established predominance in respect to the applications discussed. Likewise, lagoons, lakes, ponds and even pools, either used for pleasure purposes or used for industrial purposes for the disposal and storage of industrial wastes, become, during the warm weather, besieged by slime due to microorganism growth and reproduction. In the case of the recreational areas, the problem of infection, odor, etc. is obvious. In the case of industrial storage or disposal of-industrial materials, the microorganisms cause additional problems which must be eliminated prior to the materials' use or the waste is treated for disposal.

It is the object of the present invention to provide compositions for controlling slime-forming microorganisms in aqueous systems, such as cooling water systems and pulp and paper mill systems, and for controlling slime formation or microorganism populations in aqueous bodies in general. Moreover, another object of the invention is the provision of methods for preserving materials and for controlling slime-forming microorganisms in any aqueous system which is conducive to the growth and reproduction of microorganisms, and, in particular, cooling water and paper and pulp mill systems. These methods employ a combination of 3,3,4,4-tetrachlorotetrahydrothiophene-1,1-dioxide (or derivative thereof) and bis (tri-n-butyl tin) oxide.

In the practice of the invention, the combination is added to the particular material to be preserved or to the system being treated, for example, cooling water systems, paper and pulp mill systems, pools, ponds, lagoons, lakes, etc., in a quantity adequate to control the slime-forming microorganisms which are contained by, or which may become entrained in, the system which is treated. It has been found that such compositions and methods control the growth and occurrence of such microorganisms as may populate these particular systems.

GENERAL DESCRIPTION OF THE INVENTION

As earlier stated, the inventive compositions comprise a combination of 3,3,4,4-tetrachlorotetrahydrothiophene-1, 1-dioxide and bis (tri-n-butyl tin) oxide or obvious derivatives thereof with either compound being present in such a quantity as to impart a synergistic behavior for the purpose to the composition as a whole. Preferably, the compositions contain a percentage by weight ranging from about 5 to 95% of the 3,3,4,4-tetrachlorotetrahydrothiophene-1,1-dioxide compound and from about 5 to about 95% of the bis (tri-n-butyl tin) oxide. When these two ingredients are mixed either beforehand or by addition to the aqueous system individually, the resulting mixtures possess a high degree of slimicidal activity which could not have been predicted beforehand from the known activity of the individual ingredients comprising the mixture. Accordingly, it is therefore possible to produce a more effective slime-control agent than has previously been available. Because of the enhanced activity of the mixture, the total quantity of biocide required for an effective treatment may be reduced. In addition, the high degree of biocidal effectiveness which is provided by each of the ingredients may be exploited without use of the higher concentrations of each. This feature is not only important and advantageous from an economical point of view, but also most desirable from the pollution or ecological standpoints. Specifically, in this regard, it may be pointed out that the smaller the amount of a chemical that is required for effective treatment, the smaller the problem in treating the wastes from these systems. In both cooling water systems and in paper and pulp mill systems, certain discharge of waste water, e.g. blowdown in cooling water systems, is a necessity. However, because of the current concern and legislation regarding the discharge of wastes, the effluent waste water must be treated to reduce and, hopefully, to eliminate any undesirable constituents. This treatment, of course, is time-consuming and costly. Accordingly, a reduction in additive usage will result in a corresponding reduction in costs for the treatment of wastes containing these additives.

As earlier indicated, synergistic activity can be obtained by combining the 3,3,4,4-tetrachlorotetrahydrothiophene-1,1-dioxide (supplied by Diamond Shamrock under designation DS–649) with any bis (tri-n-butyl tin) oxide compound which exhibits growth inhibitory or biocidal activity with respect to bacteria, fungi and/or algae.

In order to illustrate the synergistic activity, the efficacy and the comparative effectiveness of the inventive compositions, various tests were utilized and will be described following.

SPECIFIC EMBODIMENTS

Example 1

Synergistic combination:
Compound A: 3,3,4,4 - tetrachlorotetrahydrothiophene-1,1-dioxide
Compound B: bis (tri-n-butyl tin) oxide The compositions of this example contained 3,3,4,4-tetrachlorotetrahydrothiophene-1,1-dioxide (referred to as Compound A in the test equations and in Tables 1 through 1C) and bis (tri-n-butyl tin) oxide (referred to as Compound B in the test equations and in Tables 1 through 1C) in the weight ratios expressed in the tables which follow. The compositions were tested for synergistic activity in accordance with the method described. The synergism test was utilized to evaluate each of the combinations of this example and the following examples.

Synergistic index test: Synergistic activity was demonstrated by adding Compound A and Compound B in varying ratios and over a range of concentrations to liquid nutrient medium which was subsequently inoculated with a standard volume of suspension of the bacterium Aerobacter aerogenes. Following two days' incubation, the lowest concentration of each ratio which prevented growth of the bacteria was taken as the end point. Growth or no-growth was determined by turbidity or clarity, respectively, in the medium. End points for the various mixtures were then compared with end points for the pure active ingredients working alone in concomitantly prepared culture bottles. Synergism was determined by the method described by Kull et al. [F. C. Kull, P. C. Eisman, H. D. Sylwestrowicz and R. L. Mayer, *Applied Microbiology, 9*, 538–41, (1961)] and the relationships, $$\frac{QA}{Qa}+\frac{QB}{Qb}=\text{additivity}$$

$$> = \text{antagonism}$$

$$< = \text{synergism}$$

where, $Qa$=Quantity of Compound A, acting alone, producing an end point
$Qb$=Quantity of Compound B, acting alone, producing an end point
$QA$=Quantity of Compound A, in the mixture, producing an end point
$QB$=Quantity of Compound B, in the mixture, producing an end point For mixtures of Compounds A and B, and for Compound A and Compound B acting alone, the following results were observed:

TABLE 1

| Weight ratio of A to B | Quantities producing end points (p.p.m.) | | | $\frac{QA}{Qa}$ | $\frac{QB}{Qb}$ | $\frac{QA}{Qa}+\frac{QB}{Qb}$ |
|---|---|---|---|---|---|---|
| | QA | QB | Mixture | | | |
| 100/0 | 2.5 | | 2.5 | | | |
| 95/5 | 1.9 | 0.1 | 2.0 | 0.76 | 0.005 | 0.77 |
| 50/50 | 1.5 | 1.5 | 3.0 | 0.60 | 0.075 | 0.68 |
| 5/95 | 0.7 | 13.3 | 14.0 | 0.28 | 0.67 | 0.95 |
| 0/10 | | 30.0 | 30.0 | | | |

It is evident from the data recorded in Table 1 that compositions of the present invention function to control slime growth due to microorganisms not only at equal portions of the respective ingredients, but also where just minor amounts of one or the other are present. This discovery of synergism at the lower levels is extremely valuable since it illustrates conclusively that the ingredients are compatible over the wide percentage by weight range.

BACTERICIDAL EFFECTIVENESS

The bactericidal effectiveness of the mixture of Compound A and Compound B of this Example is demonstrated by the following Table in which the inhibiting power of a 50/50 by weight mixture of A and B is shown. *Aerobacter aerogenes* was employed as the test organism and a substrate technique was utilized. Specifically, the biocidal mixture was added in gradually increasing quantities to nutrient agar media which was then inoculated with *A. aerogenes*. The preparation was then incubated for 48 hours. The values set forth in the Table indicate the quantity of biocide required, in parts by weight for each one million parts by weight of the medium, in order to achieve complete inhibition of the growth of the test organism.

TABLE 1A

Biocidal material: Quantity (p.p.m.) required for inhibition of *A. aerogenes*
Compound A (5%), Compound B (5%), inert (90%) ------------------------------------- 8

FUNGICIDAL EFFECTIVENESS

In order to test the effectiveness of the inventive mixtures in respect to fungi, evaluations were made following the procedures described by B. F. Shema and J. H. Conkey [*Journal for The Technical Association of The Pulp and Paper Industry, 36*, 20A–30A, (1953)]. The described procedure generally entails incorporating the biocide under test in a nutrient substrate such as agar, malt, etc. and pouring the resulting medium into a Petri dish and allowing the medium to solidify. A button of fungus inoculum is placed on the surface of the solidified medium and the medium is incubated for a period of 14 days. After the period, the diameter of the colony is measured and compared with the diameter of the button of inoculum originally placed upon the surface. If there is no increase in the diameter, the growth of the fungus is considered to be completely inhibited and the treatment level which accomplished this is considered the inhibitory concentration. The fungal species utilized as the test microorganism to evaluate the efficacy of the present mixture were *Penicillium expansum* and *Aspergillus niger*.

TABLE 1B

| Biocidal material | Quantity (p.p.m.) for inhibition | |
|---|---|---|
| | *P. expansum* | *A. niger* |
| Compound A (5%), Compound B (5%), inert (90%) | 50 | 50 |

SLIME CONTROL EFFECTIVENESS

The inventive methods and compositions were also tested with respect to their performance in the control of slime formation in industrial systems. In this test, an industrial recirculating water was obtained from a system which was currently experiencing problems in respect to the formation of slime by microorganisms. Such tests do not demonstrate the efficiency of the biocide employed with respect to the specific species of microorganisms but instead supply a practical demonstration of the efficacy of the biocide tested in relation to those communities of microorganisms which have evidenced their ability to form slime in actual industrial systems.

In the testing of recirculating water samples, a substrate evaluation was employed. In such testing, identical portions of water samples are treated with varying concentrations of biocide and two portions are left untreated to serve as controls. The control portions are plated for total count at the beginning of biocide treatment and all portions are plated for total count at the beginning of biocide treatment. Using the counts obtained from plating, the percentage kill (based on the initial count) may be calculated. In this evaluation, the water sample was taken from a paper machine broke sample from a mill located in the northeastern United States.

For the purposes of comparison, the mixture of A and B was evaluated together with a recognized commercial biocide, pentachlorophenol.

TABLE 1C

| Biocidal product | Quantity of biocide (p.p.m.) | Percent kill after 6 hours |
|---|---|---|
| Compound A (5%), Compound B (5%), inert (90%) | 5 | 97 |
|  | 10 | 99 |
|  | 25 | 99 |
|  | 50 | 99 |
|  | 100 | 99 |
| Pentachlorophenol (100%) | 5 | 0 |
|  | 10 | 0 |
|  | 25 | 22 |
|  | 50 | 27 |
|  | 100 | 53 |

When the inventive compositions are employed in the treatment of cooling or paper mill water, they are preferably utilized in the form of relatively dilute solutions or dispersions. For example, a preferred solution comprises between 5 to 65% by weight of the synergistic combination in admixture with various solvents and solubilizing agents. An example of such a synergistic biocidal product comprises from about 5 to 10% by weight of the bis (tri-n-butyl tin) oxide, from about 5 to 10% by weight of the 3,3,4,4-tetrachlorotetrahydrothiophene-1,1-dioxide and the remainder composed of such materials as surfactants, stabilizers, organic solvents such as alkanols, aromatic hydrocarbons and/or water.

Surfactants such as the alkylaryl polyether alcohols, polyether alcohols, sulfonates and sulfates, and the like, may be employed to enhance the dispersibility and stability of these dispersions. The foregoing solutions of the biocidal compositions are utilized in order to insure the rapid and uniform dispersibility of the biocides within the industrial water which is treated. It has been found that either aqueous or non-aqueous solvents are generally suitable in the preparation of compositions of the invention, e.g., methyl Cellosolve, organic solvents such as the aliphatic and aromatic hydrocarbons, e.g. kerosene. Based upon the synergism study as outlined above, it was ascertained that in the treatment of paper mill and cooling water, effective biocidal action is obtained when the concentration or treatment level of the combination or admixture of biocides is between 0.5 parts per million to 1000 parts per million, and preferably between 25 and 100 parts per million, based upon the total content of the aqueous system treated, e.g., the total quantity of cooling water or paper mill water.

The compositions may also be utilized for the preservation of slurries and emulsions containing carbohydrates, proteins, fats, oils, etc.; dosage levels for this purpose range in the vicinity of 0.01 to 5%. The compositions of the invention which can be prepared by merely combining the respective ingredients and mixing thoroughly at standard conditions may be fed continuously to the treated system, e.g., by means of a metered pump, or may be fed periodically at predetermined intervals calculated to control the growth of slime-forming organisms in the system. Naturally, in the treatment of cooling water, the feeding of the inventive compositions must be designed to compensate for blowdown in those systems which employ that expedient.

Although the foregoing has been specifically directed to liquid formulations, the combinations of the invention may, of course, be formulated dry with well-known pelletizing agents, e.g., sodium chloride, talc, aluminate, etc. to produce solid pellets or briquettes which are added directly to the systems to be treated. The pellets or briquettes, of course, dissolve in accordance with predetermined conditions or rates.

In describing the inventive subject matter, the expression "composition" has been utilized. However, it is to be understood that physical compositions or combinations are not the sole utility of the invention. If, for example, the separate ingredients of the "composition" are added independently to a particular system, it is intended that this usage of the subject matter is within the scope of the invention and is to be construed within the broad interpretation of "composition" and/or "combination."

As would be expected, the inventive composition may be added to the cooling water or paper and pulp mill systems at any convenient point. Naturally, in once-through or non-circulating systems, the composition must be added upstream from the point or points at which microorganism control is desired. In circulating systems or pulp and paper systems, the compositions must be added at any point provided that the time lapse and the conditions experienced between point of addition and the point at which the effect of the composition is to be experienced are not so drastic as to result in the neutralization of the effect of the composition.

Although the invention has been described specifically as being directed to specific compositions comprising 3,3,4,4-tetrachlorotetrahydrothiophene-1,1-dioxide in combination with the bis (tri-n-butyl tin) oxide as described in Example 1, it is obvious that homologs, analogs, etc. of the 3,3,4,4-tetrachlorotetrahydrothiophene-1,1-dioxide compound are certainly operable for the purpose. Likewise, the derivatives of the specially exemplified bis (tri-n-butyl tin) oxide compound also have utility in the present inventive concept. The provision, of course, is that the respective derivatives of the respective compounds possess the capacity to control or inhibit the growth of bacteria, fungi and/or algae.

It should be noted that while the evidence has been derived from the treatment of samples taken from paper and pulp mill aqueous systems, the compositions and methods of the present invention are broadly applicable to the treatment of aesthetic waters as well as industrial waters such as cooling waters which are plagued by deposits formed by slime-forming organisms, or by the very presence of such organisms.

Having thus described the invention, what we claim is:

1. A method for controlling the growth of the microorganism *Aerobacter aerogenes* in an aqueous system in which said microorganism is found which comprises adding to said system so as to contact said microorganism an effective amount of a combination comprising 3,3,4,4-tetrachlorotetrahydrothiophene-1,1-dioxide and bis (tri-n-butyl tin) oxide, wherein the weight ratio of the dioxide to said tin oxide is from 5% to 95% to about 95% to 5%.

2. A method according to claim 1 wherein the combination is added to said system in an amount of from about 0.5 to about 1000 parts by weight of said composition per parts by weight of said aqueous system.

3. A method according to claim 2 wherein the composition is added to said system in an amount of 1 to 100 parts per million parts of said aqueous system.

4. A method according to claim 2 wherein the aqueous system is the aqueous system of a cooling water system.

5. A method according to claim 2 wherein the system is the aqueous system of a pulp and paper mill system.

6. A method of preserving materials which are subject to attack by the microorganism *Aerobacter aerogenes* which comprises incorporating in said material containing an amount of said microorganism from about 0.5 to 5% by weight of a combination comprising 3,3,4,4-tetrachlorotetrahydrothiophene-1,1-dioxide and bis (tri-n-butyl tin) oxide and derivatives thereof, wherein the weight ratio of the dioxide to said tin oxide is from 5% to 95% to about 95% to 5%.

7. A composition which is effective for controlling the growth of the microorganism *Aerobacter aerogenes* in an aqueous system in which said microorganism is found comprising 3,3,4,4-tetrachlorotetrahydrothiophene-1,1-dioxide and bis (tri-n-butyl tin) oxide and derivatives thereof, wherein the weight ratio of the dioxide to said tin oxide is from 5% to 95% to about 95% to 5%.

8. A biocidal product which is effective for controlling the growth of the microorganism *Aerobacter aerogenes* in an aqueous system in which said microorganism is found comprising from about 5 to 10% by weight of 3,3,4,4-tetrachlorotetrahydrothiophene - 1,1 - dioxide and from about 5 to 10% by weight of bis (tri-n-butyl tin) oxide and derivatives thereof, and the remainder composed of a material selected from the group consisting of surfactants, stabilizers, organic and inorganic solvents and mixtures thereof.

9. A method according to claim 1, wherein said weight ratio is 50% to 50%.

10. A composition according to claim 7, wherein said weight ratio is 50% to 50%.

References Cited
UNITED STATES PATENTS

| | | | |
|---|---|---|---|
| 2,939,871 | 6/1960 | Pyne et al. | 71—91 |
| 3,073,691 | 1/1963 | Bluestone et al. | 71—91 |
| 3,344,019 | 9/1967 | Sowa | 71—67 |

JAMES O. THOMAS, JR., Primary Examiner

U.S. Cl. X.R.

71—67; 162—190; 424—275